US011965525B1

(12) United States Patent
Jakobsen et al.

(10) Patent No.: US 11,965,525 B1
(45) Date of Patent: Apr. 23, 2024

(54) PUMP UNIT

(71) Applicant: GRUNDFOS HOLDING A/S, Bjerringbro (DK)

(72) Inventors: Emil Schrøder Jakobsen, Bjerringbro (DK); Ulla Busk Pedersen, Bjerringbro (DK); Thiagarajan Chitoor Arasu, Bjerringbro (DK); Jesper Røntved Jørgensen, Bjerringbro (DK); Tomas Thörsman, Egå (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 34 days.

(21) Appl. No.: 17/708,234

(22) Filed: Mar. 30, 2022

(51) Int. Cl.

| | |
|---|---|
| ***H01R 13/44*** | (2006.01) |
| ***F04D 13/06*** | (2006.01) |
| ***F04D 29/42*** | (2006.01) |
| ***H01R 13/512*** | (2006.01) |

(52) U.S. Cl.
CPC ........... *F04D 29/426* (2013.01); *F04D 13/06* (2013.01); *H01R 13/44* (2013.01); *H01R 13/512* (2013.01)

(58) Field of Classification Search
CPC ....... F04D 29/426; F04D 13/06; H01R 13/44; H01R 13/512
See application file for complete search history.

(56) References Cited

U.S. PATENT DOCUMENTS

| | | | | |
|---|---|---|---|---|
| 10,381,754 B1 * | 8/2019 | Wu | H01R 13/6275 | |
| 11,542,957 B2 * | 1/2023 | Bedin | F04D 29/588 | |
| 2008/0188139 A1 * | 8/2008 | Poulin | H01R 9/24 | 439/686 |
| 2009/0017675 A1 * | 1/2009 | Daly | H01R 13/746 | 439/502 |
| 2010/0090635 A1 * | 4/2010 | Andersen | F04D 13/0686 | 310/71 |
| 2011/0256748 A1 * | 10/2011 | Davison | H01R 33/465 | 439/345 |
| 2012/0181867 A1 * | 7/2012 | Campbell | A61H 33/60 | 307/38 |
| 2015/0053140 A1 * | 2/2015 | Roh | A01K 1/011 | 119/163 |
| 2020/0047109 A1 * | 2/2020 | Maxwell | B01D 53/047 | |
| 2022/0224209 A1 * | 7/2022 | Guardiola | H02K 15/02 | |
| 2023/0400028 A1 * | 12/2023 | Porras | H02K 13/10 | |

* cited by examiner

*Primary Examiner* — Truc T Nguyen
(74) *Attorney, Agent, or Firm* — McGlew and Tuttle, P.C.

(57) ABSTRACT

A pump unit (2) includes a first housing with at least a first electrical plug connector (12) on the outside of the first housing and a separate connector housing (16) connected to the first housing and including at least a first mating plug connector. The mating plug connector is engaged with the first electrical plug connector (12). An electrical connection terminal (42) is provided in the interior of the separate connector housing (16), which electrical connection terminal (42) is connected to the first mating plug connector and is configured for connection to one electrical cable or a plurality of electrical cables.

38 Claims, 6 Drawing Sheets

PUMP UNIT

TECHNICAL FIELD

The invention refers to a pump unit, in particular a pump unit comprised of a pump device and an electric drive motor.

TECHNICAL BACKGROUND

Pump units comprising a pump device, in particular a centrifugal pump and an electric motor are for example known as circulator pumps for heating and/or cooling systems. For the electrical connection those pumps either have a plug connector or a terminal compartment with electric terminals therein for connection to an electric cable.

SUMMARY

It is an object of the invention to provide a solution to easily adopt the configuration of a pump unit to allow either the connection to an electric supply cable via a plug connector or a terminal connection.

This object is achieved by a pump unit comprising a first housing with at least a first electrical plug connector on an outside of this first housing. A separate connector housing is connected to the first housing and comprises at least a first mating plug connector, which mating plug connector is engaged with the first electrical plug connector. An electrical connection terminal is provided in an interior of the separate connector housing. The electrical connection terminal is connected to the first mating plug connector and is configured to connect to one electrical cable or to a plurality of electrical cables. Preferred embodiments are disclosed herein, including in the following description and the accompanying drawings.

The pump unit according to the invention has a first housing with at least a first electrical plug connector on the outside of this first housing. This first housing may be a motor housing and/or an electronics housing of the pump unit comprising electronics for control of the pump, i.e. control of the electric drive motor. Connected to this first housing there is a pump housing comprising the pump device, for example a centrifugal pump device. Furthermore, according to the invention the pump unit comprises a separate connector housing which is connected to said first housing. The connector housing comprises at least a first mating plug connector. This mating plug connector has a shape complementary to the shape of the first electric plug connector, such that the at least one first electrical plug connector can be engaged with this mating plug connector. With the separate connector housing attached to the first housing the first electrical plug connector and the mating plug connector are in mechanical and electrical engagement. Inside the separate connector housing there is provided at least one electrical connection terminal. This electrical connection terminal is connected to the first mating plug connector, in particular electrically connected, and it is configured and provided for connection to at least one electrical cable (to one electrical cable or to a plurality of electrical cables). Depending on the number of connectors of the electrical cables which shall be connected to the first electrical plug connector there may be provided a corresponding number of electrical connection terminals, for example in case of a three-conductor-cable, there are three electrical connection terminals, each for one conductor of the cable. Each electrical connection terminal is electrically connected to one conductor in the at least first electrical plug connector.

This arrangement allows to connect an electrical cable with a pump unit having an electrical plug connector. If it is necessary or desired to connect an electrical cable to this electrical plug connector, the separate connector housing can be attached to the first electrical plug connector so that inside the separate connector housing the required terminals for connecting wires or cables are provided. Furthermore, the connector housing may provide the necessary minimum interior volume required for fulfilling electrical standards or safety regulations. The connection terminals may be clamping terminals or screw terminals, for example.

Preferably, said connector housing comprises at least one removeable cover or lid covering the interior of the connector housing, wherein the removeable lid is arranged such that by removing the lid the at least one electrical connection terminal is accessible. This allows to open the lid for connecting an electric cable with the at least one electrical connection terminal. After connecting the terminal, the removeable lid can be closed so that the terminal connection is safely insulated inside the connector housing.

According to a further embodiment said connector housing has at least one cable feedthrough for at least one electrical cable. Through this cable feedthrough the cable can extend into the interior of the connector housing. Preferably the cable feedthrough has a sealing and/or a strain relief.

The first electrical plug connector according to a further embodiment is configured for connecting the pump unit to a power supply, i.e. the at least one first electrical plug connector may be a mains (utility power line) plug connector. This means the electrical plug connector and terminals inside the separate connector housing are preferably configured for use with a mains voltage. Thus, preferably the at least one first plug connector and the terminals inside the separate connector housing as well as the configuration of the connector housing fulfill electrical standards or safety requirements for use with mains voltage.

According to a further embodiment said connector housing is fastened to the first housing by at least one fastening means. The fastening means may be a mechanical fastening device providing a positive mechanical engagement and/or force fit. The fastening means may be or comprise means for a snap fit. Furthermore, the fastening means may be bolts or screws or any other suitable fastening element.

As mentioned before, said connector housing may be fastened to the first housing by a positive mechanical engagement. In particular said connector housing may clasps around at least one portion of said first housing, i.e. one portion of the first housing engages into the connector housing arrangement, such that a frictional and/or a positive mechanical engagement between the at least one portion of said first housing and the connector housing is achieved.

According to a further embodiment said connector housing clasps around at least one protrusion of said first housing. This protrusion in particular may be the at least one electrical plug connector. According to this configuration the connector housing is fastened on the protrusion or electrical plug connector. The protrusion or electrical plug connector may engage into a receptacle provided in the connector housing or between parts of the connector housing. Thus, preferably the assembly does not require any further connecting element on the first housing.

Furthermore, there may be provided at least one locking element which is configured to lock the connection between the first housing and the connector housing. For example, the locking element may be at least one screw connecting two parts of the connector housing with the portion of the first housing arranged between these two parts of the connector housing. For example, the fastening element may additionally provide the function of the locking element. In particular the first electrical plug protruding from the outside of the first housing may engage into a receptacle or space provided between two parts of the connector housing, wherein these two parts are locked by the at least one locking element, for example a screw or other suitable locking elements. This allows to easily connect the connector housing with the first housing and preferably allows to remove the connector housing from the first housing by unlocking and/or removing the locking element.

According to a further embodiment the at least one locking element is configured and arranged such that for loosening the connection between the first housing and the connector housing the at least one locking element is accessible solely from the interior of the connector housing. For example, a lid of the connector housing may cover the locking element such that the locking element is accessible when removing the lid. Such an arrangement ensures that the locking element cannot be unlocked without first opening the connector housing. Thus, an accidental removal of the connector housing can be prevented.

Furthermore, the connector housing may comprise a bottom part including the first mating connector and comprise a retainer, wherein the bottom part and the retainer are secured to one another via at least one fastening or locking element, with the first plug connector on the first housing being retained between the bottom part and the retainer. The retainer and the bottom part for example may be fastened and locked via a screw. By removing or loosening the locking element, the bottom part and the retainer may be separated such that they can be removed from the plug connector.

As mentioned before the locking element may be a screw, which screw head preferably is accessible from the interior of the connector housing. Thus, when the connector housing is opened, for example by removing a lid, the screw head can be engaged, and it is possible to loosen the screw by turning the screw head.

The retainer may comprise at least one receptacle engaging with a back side of the at least one electrical plug connector. This receptacle ensures a defined engagement between the retainer and the electrical plug connector which is protruding from the outside of the first housing. Preferably a positive mechanical engagement between the receptacle and the back side of the electrical plug connector is achieved. The back side of the at least one electrical plug connector is the side facing away from the side which is provided for engagement with the mating plug connector, i.e. facing away from the side having electrical contacts or openings with the electrical contact therein.

In a further possible embodiment, there may be at least one second plug connector arranged on the outside of the first housing, wherein the at least one second plug connector extends into the interior of the connector housing. Thus, the second plug connector preferably is accessible from the interior of the connector housing such that a mating connector plug can be engaged with the at least one second plug connector inside the connector housing. The second plug connector preferably is a plug connector used with a low voltage, i.e. an extra low voltage. For example, the second plug connector may be provided for communication purposes. Thus, the second plug connector may be in connection with control electronics inside the first housing.

According to a further possible embodiment there may be a separating wall in the interior of the connector housing, which separating wall delimits a terminal space containing the at least one electrical connection terminal. In particular the separating wall may delimit this terminal space from a further connection space inside the connector housing. In this further connection space for example the second plug connector may be arranged. The separating wall can delimit the terminal space containing contacts for mains voltage. Furthermore, such separating wall may keep away moisture or water from the at least one terminal in the connector housing, i.e. in a terminal space of the connector housing. Preferably, said separating wall is arranged such that in a predefined mounting orientation of the pump unit the at least one electrical connection terminal is arranged below the separating wall. The predefined mounting orientation preferably is an orientation of the pump unit in which a rotational axis of an impeller of the pump unit extends in horizontal direction. This is the usual mounting direction for circulator pumps. These are in particular centrifugal pumps having a wet running electrical drive motor, i.e. a drive motor with a rotor can be arranged between the rotor space and a stator space. In this predefined mounting orientation, it is beneficial to have the separating wall above the electrical connection terminal so that the separating wall prevents water entering the terminal space from above. When installing circulator pumps in heating devices sometimes water can drop on the top of the pump unit. Thus, it is advantageous to have the separating wall above the electric connection terminal forming an additional barrier inside the connector housing in addition to the outer walls of the connector housing.

Such a connector housing, in particular the outer walls of the connector housing, may at least partly be made from plastic material, in particular by injection molding. The plastic material has insulating properties. Furthermore, the injection molding process allows to easily achieve the desired shape for positive mechanical engagement with the electrical plug connector on the outside of the first housing.

According to a further embodiment the interior of the connector housing has a volume corresponding to or being greater than the required minimum volume for terminal compartments conformable to the standard according to the National Electric Code (NEC), in particular for a three-conductor-cable according to standard AWG12. For a cable having the size of AWG12 and three conductors according to this standard the minimum volume must be three times 37 $cm^3$. The separate connector housing allows to realize the required volume. Furthermore, by providing different sized connector housings it is easily possible to adapt the pump unit to different standards.

As mentioned above, preferably the pump unit comprises a centrifugal pump, further preferably having a wet running electric drive motor. Preferably the pump is a circulator pump unit, in particular a circulator pump unit for use in a heating and/or cooling system.

In the following, the invention is described by way of example with reference to the accompanying drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
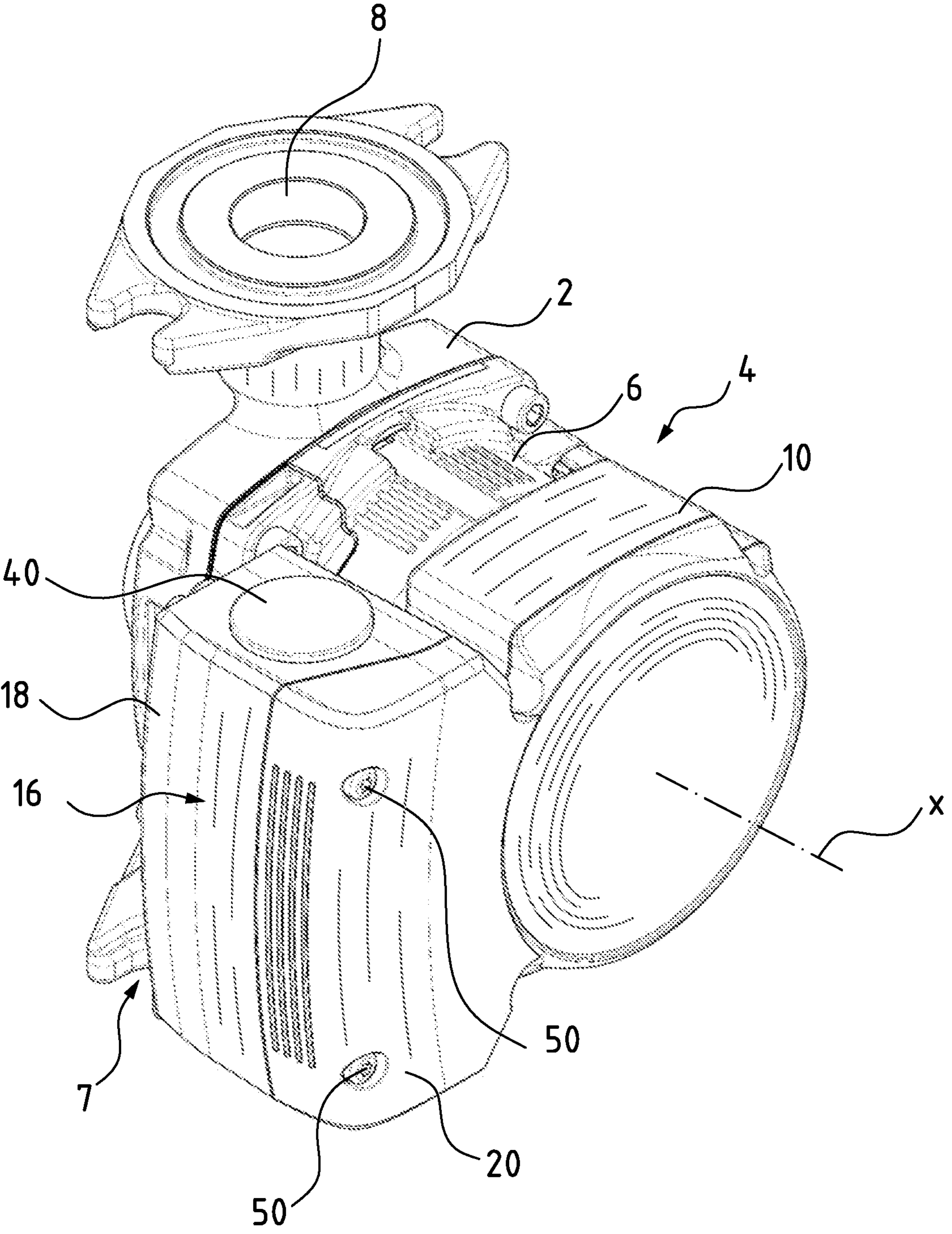
FIG. 1 is a perspective view of a pump unit according to the invention.
Figure 2:
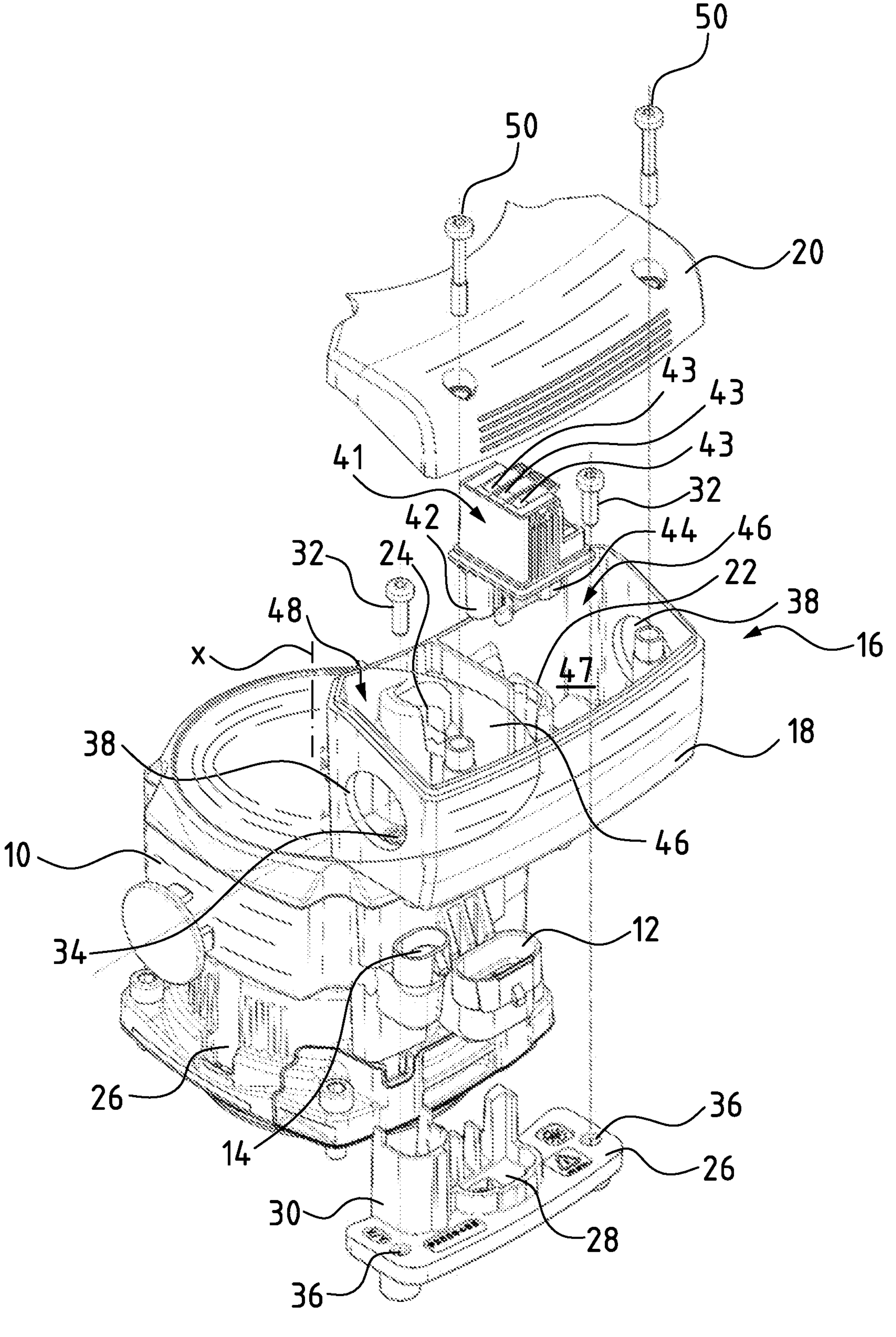
FIG. 2 is a partly exploded view of the motor assembly of the pump unit according to FIG. 1.
Figure 3:
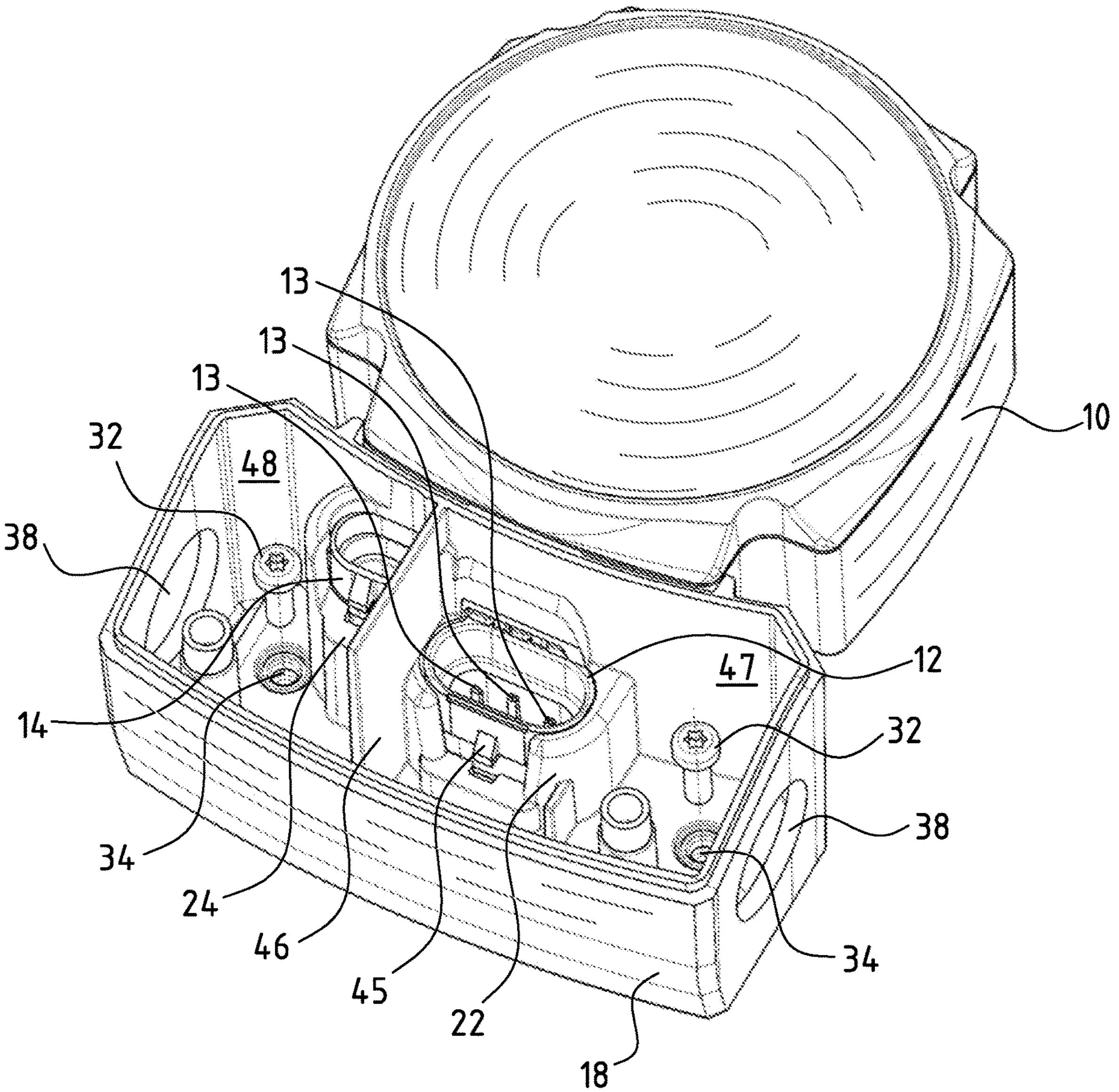
FIG. 3 is a perspective view of the connector housing of the pump unit according to FIGS. 1 and 2, in an open state prior to inserting the terminal device.
Figure 4:
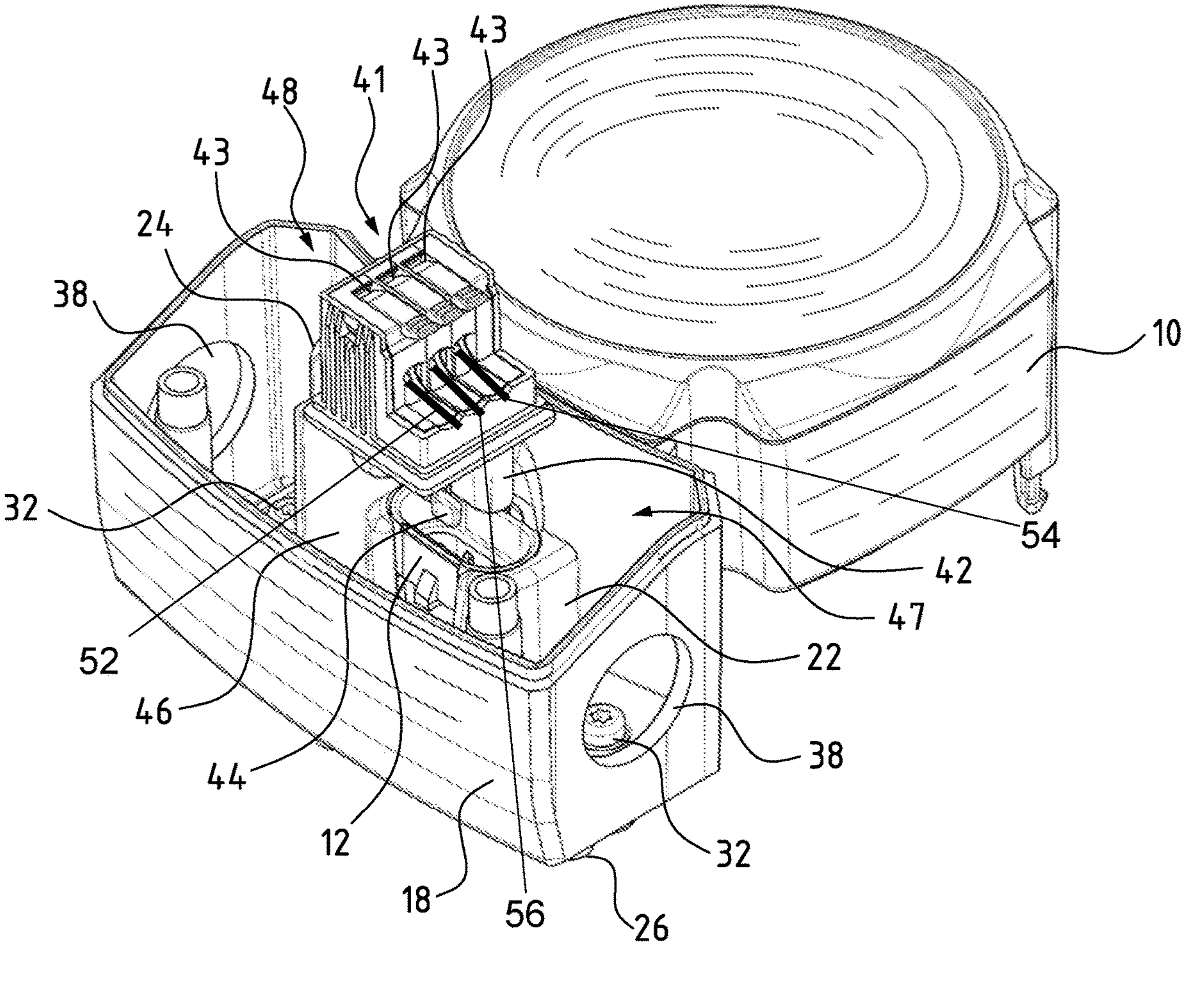
FIG. 4 is a perspective view of the connector housing of the pump unit according to FIG. 3, in an open state with the terminal device prior to insertion.
Figure 5:
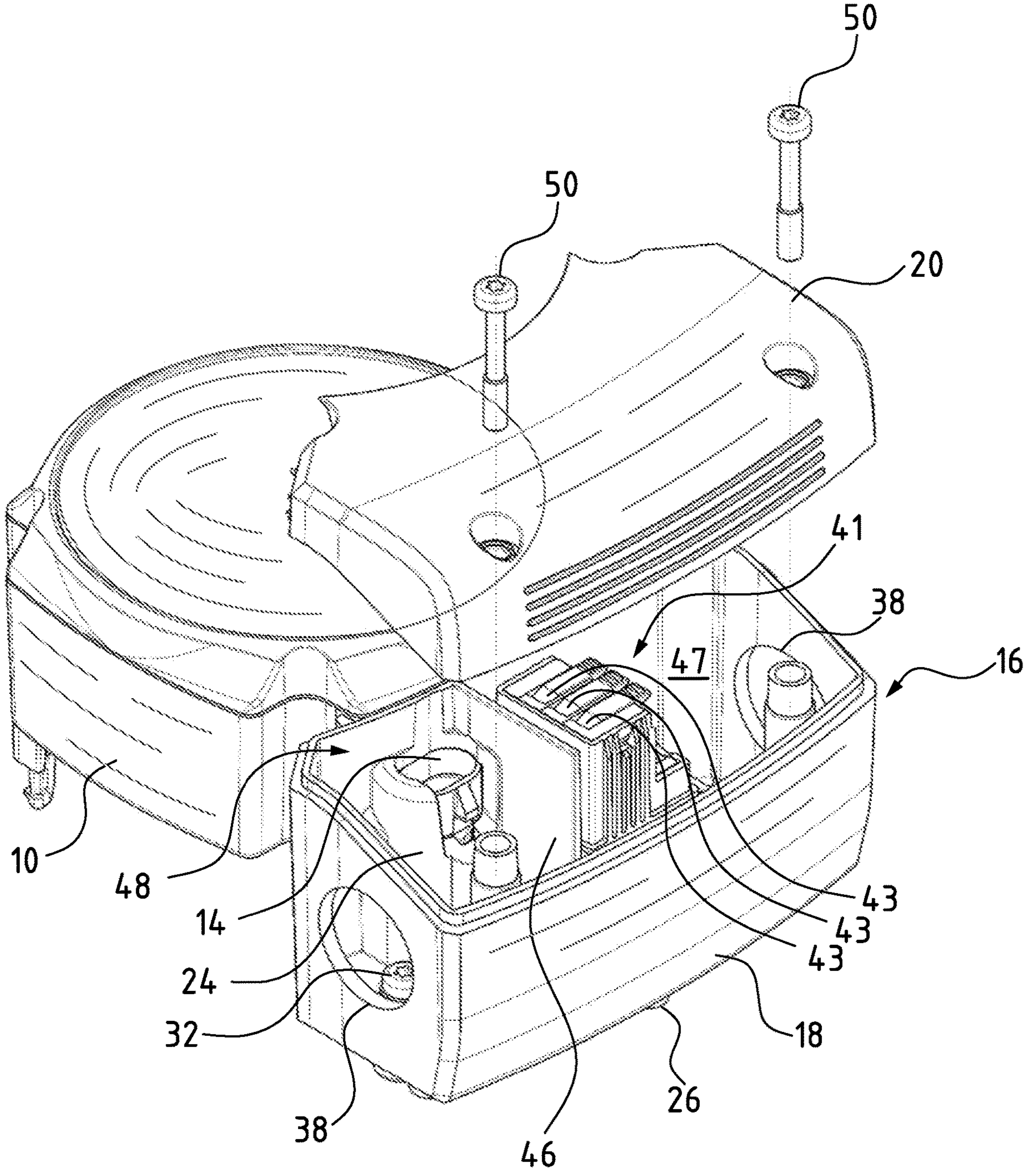
FIG. 5 is a partly exploded view of the connector housing of the pump unit according to FIGS. 3 and 4 with the inserted terminal device.
Figure 6:
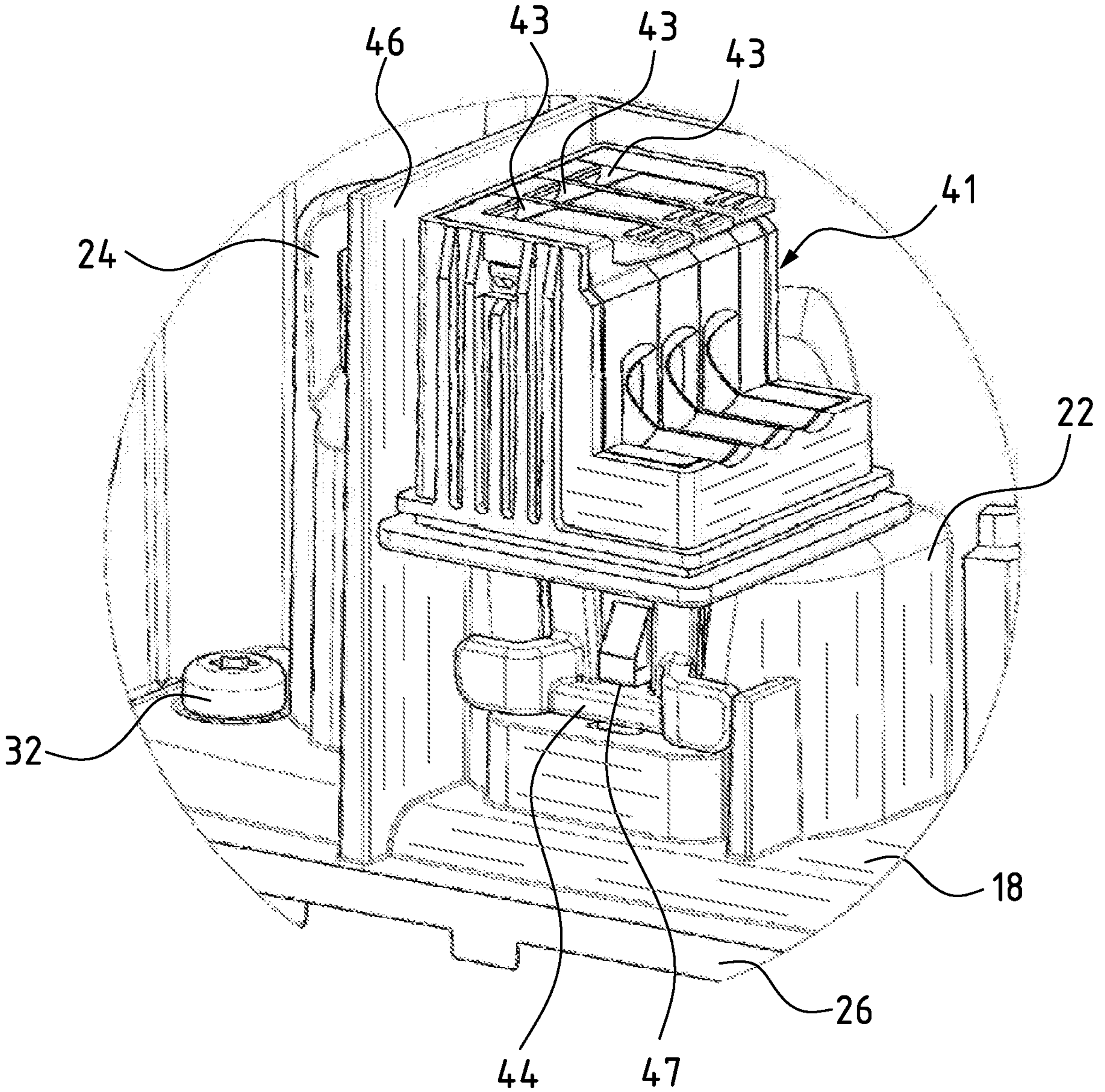
FIG. 6 is a detailed side view of the connection terminals inserted into the connector housing.

Referring to the drawings, the pump unit as shown in FIG. 1 has a pump housing 2 and a motor assembly 4. Inside the pump housing 2 there is arranged an impeller, which is rotatable about the rotational axis X. The impeller is driven by an electric drive motor which is arranged in the motor housing 6 of the motor assembly 4. The pump housing 2 has an inlet port 7 (not visible in FIG. 1) and an outlet port 8. The pump housing 2 and the hydraulic components inside the pump housing are configured in usual manner. On the axial end side of the motor housing 6 there is arranged an electronics housing 10 containing the control electronics of the pump unit, in particular for the drive motor arranged in the motor housing 6. The electronics housing 10 is a first housing. This housing comprises a first electric plug connector 12 and a second electric plug connector 14 arranged on a side wall of the electronics housing 10, as shown in FIG. 2. The first electric plug connector 12 is a mains connector with electrical contacts 13 and is configured for connecting a mains cable for power supply of the pump unit 2. The second electric plug connector 14 is provided for communication, i.e. a communication cable can be connected to this second electric plug connector 14.

To allow the connection of a mains cable not having a mating plug connector insertable into the first electric plug connector 12, the pump unit 2 comprises a separate connector housing 16 connected to the electronics housing 10 and the first and second electric plug connectors 12 and 14. The connector housing 16 comprises a bottom part 18 consisting of a bottom and side walls extending from this bottom and forming a box shape with an opening on the top which is closed by a lid 20. The bottom part 18 and its bottom define receptacles 22 and 24 into which the first electric plug connector 12 and the second electric plug connector 14 engage when the bottom part 18 is attached to the electronics housing 10. For attaching the bottom part 18 to the electronics housing 10 the bottom part 18 is moved in parallel to the longitudinal or rotational axis X such that the first electric plug connector 12 engages into receptacle 22 and the second electric plug connector 14 engages into receptacle 24. For securing the connection of the connector housing 16 with the electronics housing 10 there is provided a retainer 26. The retainer 26 is attached to the bottom side of the first electric plug connector 12 and the second electric plug connector 14 facing away from the bottom part 18. The retainer 26 comprises a first receptacle 28 and a second receptacle 30. The first receptacle 28 is engaged with the first plug connector 22 and the second receptacle 30 is engaged with the second electric plug connector 14. The bottom part 18 and the retainer 26 are connected by two screws 32 foil ling locking elements. The screws 32 extend through holes 34 in the bottom of the bottom part 18 and are engaged into screw holes 36 in the retainer 26. Thus, the heads of the screws 32 are arranged in the interior of the connector housing 16 and covered by the lid 20. Thus, the screws 32 are not accessible if the lid 20 is closed. By this, undesired unlocking of the connector housing 16 can be prevented. The bottom part 18 and the retainer 26 provide a positive mechanical fit or connection between the electronics housing 10 and the connector housing 16 by clasping the first and second plug connectors 12, 14 protruding from the electronics housing 10.

The receptacle 24 has an opening towards the interior of the electronics housing 10 such that the second electric plug connector 14 is accessible from the interior of the connector housing 16 and a mating plug connector can be inserted into the electric plug connector 14 in the interior of the connector housing 16. A cable connected to such a mating plug connector may extend through one of the openings 38 to the outside. The openings 38 are closed by plugs 40. The plugs 40 may contain a cable feedthrough with a sealing. Furthermore, in the plug 40 there may be provided a strain relief for a cable. In case that no cable is fed through an opening 38 a closed plug 40 as shown is used to close the opening.

The receptacle 22 in the bottom part 18 in engagement with the first electric plug connector 12 such that the first electric plug connector 12 is accessible from the interior of the connector housing 16. For connecting a cable to the first electric plug connector 12 there is arranged a terminal device 41 having a mating plug connector 42 providing an electric connection to the electrical contacts 13 of the first electric plug connector 12. The terminal device 41 further comprises electric connection terminals 43 configured for connection to the conductors of a cable. Thus, by inserting the terminal device 41 into the first plug connector 12 electric connection terminals 43 are provided in the interior of the connector housing 16. The terminal device 41 with its mating plug connector 42 extends through the receptacle 22 into the first plug connector 12. The terminal device 41 is locked on the first plug connector 12 by a latch element 44 engaging with a hook 45 on the outside of the first plug connector 12. The mating plug connector 42 is in electric connection with the electric connection terminals 43. The electric connection terminals 43 are configured to be connected with wires 52, 54, 56 of an electric supply or mains cable. The cable may extend through one of the openings 38 to the outside. This allows to connect a connection cable without a plug connector with the pump unit 2 having an electric plug connector 12 for the power supply. Thus, the same pump unit can be used either with a power cable having a plug connector or with a power cable having bare ends. In this case the connector housing 16 has to be attached to the electronics housing 10. By the connector housing 16 in particular electrical standards requiring a certain size of the terminal compartment can be fulfilled. The terminal compartment is defined by volume in the interior of the connector housing 16.

In this embodiment there is arranged a separating wall 46 in the interior of the connector housing 16. The separating wall 46 is arranged between the first receptacle 22 and the second receptacle 24 dividing the interior of the connector housing 16 into a terminal space 47 and the connection space or connection compartment 48 containing the second receptacle 24 with the inserted second plug connector 14. The terminal space 47 is a terminal compartment according to the electric standards as mentioned before.

For operation the pump unit 2 as described is arranged as shown in FIG. 1 with the longitudinal or a rotational axis X in a horizontal position. In this predefined operational position of the pump unit 2 the separating wall 46 extends horizontally above the terminal space 47 or terminal compartment and the electric connection terminals 43 therein. The separating wall 46 thus covers the electric connection terminals 43 and can prevent water or moisture from entering in the terminal space 47.

The lid 20 is secured by two screws 50 engaging into the bottom part 18. With the lid 20 attached to the bottom part 18 and secured by screws 50, the connector housing 16 is closed such that the connection terminals 43 in the interior are safely covered. In this condition the screws 32 are not accessible from the outside so that the connector housing 16 cannot be removed from the motor housing 6.

While specific embodiments of the invention have been shown and described in detail to illustrate the application of the principles of the invention, it will be understood that the invention may be embodied otherwise without departing from such principles.

LIST OF REFERENCE NUMERALS

- 2 pump housing
- 4 motor assembly
- 6 motor housing
- 7 inlet port
- 8 outlet port
- 10 electronics housing
- 12 first electric plug connector
- 13 electrical contacts
- 14 second electric plug connector
- 16 connector housing
- 18 bottom part
- 20 lid
- 22, 24 receptacles
- 26 retainer
- 28 first receptacle
- 30 second receptacle
- 32 screws
- 34 holes
- 36 screw holes
- 38 openings
- 40 plugs
- 41 terminal device
- 42 mating plug connector
- 43 electric connection terminals
- 44 latch element
- 45 hook
- 46 separating wall
- 47 terminal space, terminal compartment
- 48 connection space
- 50 screws
- X rotational axis

What is claimed is:

1. A pump unit comprising:

a first housing with at least a first electrical plug connector on an outside of the first housing;

a second housing in a form of a separate connector housing connected to said first housing and comprising a first mating plug connector, which mating plug connector is engaged with the first electrical plug connector; and an electrical connection terminal provided in an interior of the separate connector housing, the electrical connection terminal being connected to the first mating plug connector and being configured to connect to one electrical cable or a plurality of electrical cables, wherein the connector housing comprises at least one removable lid covering the interior of the separate connector housing, wherein the removable lid is configured and arranged such that in a lid removed state of the lid the at least one electrical connection terminal is accessible.

2. A pump unit according to claim 1, wherein the separate connector housing has one or more cable feedthroughs for one electrical cable or a plurality of electrical cables.

3. A pump unit according to claim 1, wherein the first electrical plug connector is configured for connecting the pump unit to a power supply.

4. A pump unit according to claim 1, further comprising a fastening means, wherein said separate connector housing is fastened to the first housing by the fastening means.

5. A pump unit according to claim 4, wherein the fastening means comprises means to fasten the separate connector housing to the first housing by a positive mechanical engagement.

6. A pump unit according to claim 1, wherein said separate connector housing clasps around at least one portion of said first housing.

7. A pump unit according to claim 1, wherein said separate connector housing clasps around at least one protrusion on said first housing.

8. A pump unit according to claim 1, wherein said separate connector housing clasps around the at least one first electrical plug connector.

9. A pump unit according to claim 1, further comprising a locking element configured to lock a connection between the first housing and the separate connector housing.

10. A pump unit according to claim 9, wherein the locking element is configured and arranged such that for loosening the connection between the first housing and the separate connector housing the at least one locking element is accessible solely from an interior of the separate connector housing.

11. A pump unit according to claim 1, wherein the separate connector housing comprises a bottom part including the first mating connector and a retainer, wherein the bottom part and the retainer are secured to one another via the locking element with the first plug connector on the first housing being retained between the bottom part and the retainer.

12. A pump unit according to claim 10, wherein the locking element comprises a screw which comprises a screw head accessible from the interior of the separate connector housing.

13. A pump unit according to claim 11, wherein the retainer comprises at least one receptacle engaging with a back side of the electrical plug connector.

14. A pump unit according to claim 1, further comprising a second plug connector on an outside of the first housing, wherein the second plug connector extends into the interior of the separate connector housing.

15. A pump unit according to claim 14, wherein the second plug connector extends into the interior of the separate connector housing such that a mating second plug connector can be engaged with said second plug connector inside the separate connector housing.

16. A pump unit according to claim 14, wherein the second plug connector is configured for data communication.

17. A pump unit according to claim 1, further comprising a separating wall in the interior of the separate connector housing, which separating wall delimits a terminal space containing the electrical connection terminal.

18. A pump unit according to claim 17, wherein the separating wall is arranged such that in a predefined mounting orientation of the pump unit the electrical connection terminal is arranged below the separating wall.

19. A pump unit according to claim 18, wherein in a predefined mounting orientation a rotational axis of an impeller of the pump unit extends in a horizontal direction.

20. A pump unit according to claim 1, wherein said separate connector housing is at least partly comprised of plastic material and is formed by injection molding.

21. A pump unit according to claim 1, wherein the interior of the separate connector housing has a volume corresponding to or greater than a required minimum volume for a terminal compartment conformable to National Electric Code (NEC) three-conductor-cable standard AWG12.

22. A pump unit according to claim 1, wherein the first housing comprises a motor housing or an electronics housing of both a motor housing and an electronics housing.

23. A pump unit according to claim 1, wherein the pump unit comprises a centrifugal pump and a wet running electric drive motor.

24. A pump unit according to claim 1, wherein the pump unit is a circulator pump configured for a heating system or a cooling system or a heating system and a cooling system.

25. A pump unit comprising:

a first housing with at least a first electrical plug connector on an outside of the first housing;

a second housing in a form of a separate connector housing connected to said first housing and comprising a first mating plug connector, which mating plug connector is engaged with the first electrical plug connector; and an electrical connection terminal provided in an interior of the separate connector housing, the electrical connection terminal being connected to the first mating plug connector and being configured to connect to one electrical cable or a plurality of electrical cables, wherein the first electrical plug connector is configured for connecting the pump unit to a power supply.

26. A pump unit comprising:

a first housing with at least a first electrical plug connector on an outside of the first housing;

a second housing in a form of a separate connector housing connected to said first housing and comprising a first mating plug connector, which mating plug connector is engaged with the first electrical plug connector; and an electrical connection terminal provided in an interior of the separate connector housing, the electrical connection terminal being connected to the first mating plug connector and being configured to connect to one electrical cable or a plurality of electrical cables, wherein said separate connector housing clasps around at least one protrusion on said first housing.

27. A pump unit comprising:

a first housing with at least a first electrical plug connector on an outside of the first housing;

a second housing in a form of a separate connector housing connected to said first housing and comprising a first mating plug connector, which mating plug connector is engaged with the first electrical plug connector;

an electrical connection terminal provided in an interior of the separate connector housing, the electrical connection terminal being connected to the first mating plug connector and being configured to connect to one electrical cable or a plurality of electrical cables; and a locking element configured to lock a connection between the first housing and the separate connector housing, wherein the locking element is configured and arranged such that for loosening the connection between the first housing and the separate connector housing the at least one locking element is accessible solely from an interior of the separate connector housing.

28. A pump unit according to claim 27, wherein the locking element comprises a screw which comprises a screw head accessible from the interior of the separate connector housing.

29. A pump unit comprising:

a first housing with at least a first electrical plug connector on an outside of the first housing;

a second housing in a form of a separate connector housing connected to said first housing and comprising a first mating plug connector, which mating plug connector is engaged with the first electrical plug connector; and an electrical connection terminal provided in an interior of the separate connector housing, the electrical connection terminal being connected to the first mating plug connector and being configured to connect to one electrical cable or a plurality of electrical cables, wherein the separate connector housing comprises a bottom part including the first mating connector and a retainer, wherein the bottom part and the retainer are secured to one another via the locking element with the first plug connector on the first housing being retained between the bottom part and the retainer.

30. A pump unit according to claim 29, wherein the retainer comprises at least one receptacle engaging with a back side of the electrical plug connector.

31. A pump unit comprising:

a first housing with at least a first electrical plug connector on an outside of the first housing;

a second housing in a form of a separate connector housing connected to said first housing and comprising a first mating plug connector, which mating plug connector is engaged with the first electrical plug connector;

an electrical connection terminal provided in an interior of the separate connector housing, the electrical connection terminal being connected to the first mating plug connector and being configured to connect to one electrical cable or a plurality of electrical cables; and a second plug connector on an outside of the first housing, wherein the second plug connector extends into the interior of the separate connector housing.

32. A pump unit according to claim 31, wherein the second plug connector extends into the interior of the separate connector housing such that a mating second plug connector can be engaged with said second plug connector inside the separate connector housing.

33. A pump unit according to claim 31, wherein the second plug connector is configured for data communication.

34. A pump unit comprising:

a first housing with at least a first electrical plug connector on an outside of the first housing;

a second housing in a form of a separate connector housing connected to said first housing and comprising a first mating plug connector, which mating plug connector is engaged with the first electrical plug connector;

an electrical connection terminal provided in an interior of the separate connector housing, the electrical connection terminal being connected to the first mating plug connector and being configured to connect to one electrical cable or a plurality of electrical cables; and a separating wall in the interior of the separate connector housing, which separating wall delimits a terminal space containing the electrical connection terminal, wherein the separating wall is arranged such that in a predefined mounting orientation of the pump unit the electrical connection terminal is arranged below the separating wall.

35. A pump unit according to claim 34, wherein in a predefined mounting orientation a rotational axis of an impeller of the pump unit extends in a horizontal direction.

36. A pump unit comprising:

a first housing with at least a first electrical plug connector on an outside of the first housing;

a second housing in a form of a separate connector housing connected to said first housing and comprising a first mating plug connector, which mating plug connector is engaged with the first electrical plug connector; and an electrical connection terminal provided in an interior of the separate connector housing, the electrical connection terminal being connected to the first mating plug connector and being configured to connect to one electrical cable or a plurality of electrical cables, wherein the first housing comprises a motor housing or an electronics housing of both a motor housing and an electronics housing.

37. A pump unit comprising:

a first housing with at least a first electrical plug connector on an outside of the first housing;

a second housing in a form of a separate connector housing connected to said first housing and comprising a first mating plug connector, which mating plug connector is engaged with the first electrical plug connector; and an electrical connection terminal provided in an interior of the separate connector housing, the electrical connection terminal being connected to the first mating plug connector and being configured to connect to one electrical cable or a plurality of electrical cables, wherein the pump unit comprises a centrifugal pump and a wet running electric drive motor.

38. A pump unit comprising:

a first housing with at least a first electrical plug connector on an outside of the first housing;

a second housing in a form of a separate connector housing connected to said first housing and comprising a first mating plug connector, which mating plug connector is engaged with the first electrical plug connector; and an electrical connection terminal provided in an interior of the separate connector housing, the electrical connection terminal being connected to the first mating plug connector and being configured to connect to one electrical cable or a plurality of electrical cables, wherein the pump unit is a circulator pump configured for a heating system or a cooling system or a heating system and a cooling system.

* * * * *